United States Patent
Kanai et al.

(10) Patent No.: US 9,849,854 B2
(45) Date of Patent: Dec. 26, 2017

(54) WORK VEHICLE

(71) Applicant: Kubota Corporation, Osaka-shi (JP)

(72) Inventors: Toshiki Kanai, Sakai (JP); Takeshi Komorida, Sakai (JP); Masahiro Izumi, Sakai (JP); Masaki Takaoka, Sakai (JP); Koichiro Matsumoto, Sakai (JP); Azusa Furihata, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/356,751

(22) Filed: Nov. 21, 2016

(65) Prior Publication Data

US 2017/0166154 A1   Jun. 15, 2017

(30) Foreign Application Priority Data

Dec. 15, 2015   (JP) .................................. 2015-244461

(51) Int. Cl.
  *B60R 21/13*   (2006.01)
(52) U.S. Cl.
  CPC ....... *B60R 21/131* (2013.01); *B60Y 2200/223* (2013.01); *B60Y 2306/01* (2013.01)
(58) Field of Classification Search
  CPC .................................................. B60R 21/131
  See application file for complete search history.

(56) References Cited

U.S. PATENT DOCUMENTS

| | | | | |
|---|---|---|---|---|
| 3,733,103 | A * | 5/1973 | Hansen | B60R 21/131 280/756 |
| 3,787,085 | A * | 1/1974 | Bucher | B60R 21/131 296/102 |
| 3,866,942 | A * | 2/1975 | Dobeus | B60R 21/131 280/755 |
| 3,873,222 | A * | 3/1975 | Babbit, Jr. | B60R 21/131 248/694 |
| 4,094,545 | A * | 6/1978 | Kramer | B60R 21/131 280/756 |
| 4,669,565 | A * | 6/1987 | Miki | B60R 21/131 180/89.12 |

(Continued)

FOREIGN PATENT DOCUMENTS

| | | | | |
|---|---|---|---|---|
| DE | 2130837 | A1 * | 12/1972 | .......... B60R 21/131 |
| DE | 2902694 | A1 * | 7/1979 | .......... B60R 21/131 |

(Continued)

*Primary Examiner* — Nicole T Verley
(74) *Attorney, Agent, or Firm* — The Webb Law Firm (57) ABSTRACT

A work vehicle includes a vehicle body frame, a protection frame extending upwards from the vehicle body frame, the protection frame including left and right strut members and an arch member extending between and detachable from the left and right strut members, a support frame provided in the vehicle body frame and configured to support the protection frame to the vehicle body frame, the support frame including a pair of left and right pipe-like supporting portions, each supporting portion being provided under a laterally outward tilted orientation with an upper portion of the supporting member being positioned on more laterally outer side of a vehicle body and being configured to removably support the strut member, and a connection tool configured to non-removably connect the left and right strut members to the left and right supporting portions.

6 Claims, 6 Drawing Sheets

(56) References Cited

U.S. PATENT DOCUMENTS

| | | | | |
|---|---|---|---|---|
| 5,779,272 | A * | 7/1998 | Panek | B60R 21/131 280/756 |
| 7,396,047 | B1 * | 7/2008 | Young | B60R 21/13 280/756 |
| 7,641,234 | B1 * | 1/2010 | Pelnar | B60R 21/13 180/900 |
| 8,029,019 | B2 * | 10/2011 | Schmidt | B60R 21/131 280/756 |
| 8,424,911 | B2 * | 4/2013 | Alexander, IV | B60R 21/131 16/375 |
| 2003/0009920 | A1 * | 1/2003 | Aoki | E02F 3/627 37/468 |
| 2004/0112667 | A1 * | 6/2004 | Minoura | B60K 7/0015 180/308 |
| 2009/0085376 | A1 * | 4/2009 | Schmitt | B60R 21/13 296/190.03 |
| 2010/0187799 | A1 * | 7/2010 | Schmidt | B60R 21/131 280/756 |
| 2013/0049338 | A1 * | 2/2013 | Alexander, IV | B60R 21/131 280/756 |
| 2014/0000667 | A1 * | 1/2014 | Biers, Sr. | B60J 11/00 135/88.01 |

FOREIGN PATENT DOCUMENTS

| | | | | |
|---|---|---|---|---|
| FR | 2110518 | A5 * | 6/1972 | B60R 21/131 |
| FR | 2122736 | A5 * | 9/1972 | B60R 21/131 |
| GB | 996000 | A * | 6/1965 | A01G 3/04 |
| JP | 60139574 | A * | 7/1985 | B60R 21/131 |
| JP | 200320677 | A | 1/2003 | |

* cited by examiner

WORK VEHICLE

CROSS-REFERENCE TO RELATED APPLICATION

This application claims priority to Japanese Patent Application No. 2015-244461 filed Dec. 15, 2015, the disclosure of which is hereby incorporated in its entirety by reference.

BACKGROUND OF THE INVENTION

Field of the Invention

Unexamined Japanese Patent Application Publication No. 2003-20677 discloses a work vehicle including a vehicle body frame and a protection frame (ROPS) extending upward from the vehicle body frame. In this work vehicle, the vehicle body frame includes a main frame and an attachment frame connected to a rear side of the main frame. Upwardly of the attachment frame, there are provided left and right ROPS attaching portions, which respectively includes an upper wall and a ROPS supporting member. Further, the protection frame includes left and right struts, a connecting portion for interconnecting upper ends of the left and right struts and a base member to which lower ends of the left and right struts are fixed. As the base member on the protection frame side is bolt-connected as being placed on the left and right upper walls on the attachment frame side and the left and right ROPS supporting members, the protection frame is fixedly attached to the vehicle body frame.

With the above arrangement, as the protection fame is bolt-connected with this protection frame being placed on the attachment frame, in order to obtain a high connection strength between the protection frame and the attachment frame, it is necessary to increase the number of bolts used for connecting the protection frame and the attachment frame. As a result, the assembly of the protection frame would be troublesome.

For this reason, there is a need for a protection frame that facilitates assembly, yet allows high-strength fixing to the vehicle body frame.

SUMMARY OF THE INVENTION

A work vehicle according to the present invention comprises:
  a vehicle body frame;
  a protection frame extending upwards from the vehicle body frame, the protection frame including left and right strut members and an arch member extending between and detachable from the left and right strut members;
  a support frame provided in the vehicle body frame and configured to support the protection frame to the vehicle body frame, the support frame including a pair of left and right pipe-like supporting portions, each supporting portion being provided under a laterally outward tilted orientation with an upper portion of the supporting member being positioned on more laterally outer side of a vehicle body and being configured to removably support the strut member; and
  a connection tool configured to non-removably connect the left and right strut members to the left and right supporting portions.

With the above solution, when a worker is to assemble the protection frame to the support frame, the worker will insert connecting portions of the left and right strut members which are removed from the arch member into the left and right supporting portions of the support frame. Then, under this state, the worker will connect the left and right connecting portions to the left and right supporting portions by the connection tool. Thereafter, the worker will connect the arch member to the left and right strut members, thus completing the assembly of the protection frame.

Under the above-described assembled state, the left and right connecting portions on the protection frame side are inserted into the left and right supporting portions which are set under the laterally outward tilted orientation in the support frame. Therefore, even if the connection by the connecting tool were absent, the protection frame would be supported to the support frame under a stable state with inhibiting displacement in the horizontal direction and the vertical direction of the protection frame relative to the support frame. Moreover, outer faces of the left and right connecting portions on the vehicle body lateral outer side are received and supported firmly by inner faces of the left and right supporting portions on the vehicle body laterally outer side with a large contact area and with a high-pressure contact force due to a wedge effect.

Thus, even if the number of the connection tools to be provided for connection between the connecting portions of the left and right strut members and the left and right supporting portions is decreased, it will still be possible to support the protection frame to the support frame firmly with high supporting strength and with reliable inhibition of inadvertent removal therefrom.

Consequently, there is obtained a protection frame that facilitates assembly, yet allows high-strength fixing to the vehicle body frame.

In the above-described configuration, preferably:
  the support frame includes left and right reception tools for receiving lower ends of the left and right strut members inserted into the left and right supporting portions.

With the above solution, when the worker insert the connecting portions of the left and right strut members into the left and right supporting portions of the support frame for connection thereto, the worker need not grip and hold the left and right strut members at predetermined connecting positions.

As a result, the assembly of the protection frame can be further facilitated.

In the above-described configuration, preferably:
  the support frame includes a laterally elongate connecting member for interconnecting the left and right supporting portions.

With the above solution, the connecting member can provide and maintain firm and reliable left-right spacing between the left and right supporting portions, so that possibility of inadvertent increase of the left-right spacing between the left and right supporting portions which could be caused by the wedge effect after the assembly of the protection frame can be avoided reliably.

As a result, the protection frame can be supported in an even more stable manner by the support frame having enhanced shape-retention ability.

In the above-described configuration, preferably:
  the support frame is disposed at a rear portion of the vehicle body frame;
  the connecting member includes left and right extending portions that extend laterally outward from the left and right supporting portions, the left and right extending portions supporting upper ends of left and right rear fenders; and
  the left and right rear fenders include recessed portions provided on left-right one end sides on the vehicle body inner side at upper ends thereof and configured to allow introduction of the left and right supporting portions.

With the above solution, the connecting member acts also as a supporting member for the left and right rear fenders. Thus, in comparison with an arrangement wherein supporting members dedicated to the rear fenders are provided instead of such connecting member, it becomes possible to achieve e.g. simplification of the configuration due to reduction in the number of components.

Moreover, contact between the left and right rear fenders and the left and right supporting portions is avoided, thus increasing the spacing between the left and right supporting portions. With this, it becomes possible to support the protection frame in an even more stable manner.

Incidentally, in order to increase the spacing between the left and right supporting portions, it is conceivable to form supporting portion inserting openings in the left and right rear fenders. In such case, however, an attachment/detachment operation of the left and right rear fenders will involve attachment/detachment of the protection frame also. Therefore, the attachment/detachment of the left and right rear fenders will become more troublesome. Consequently, the operations for attachment/detachment of the left and right rear fenders such as a maintenance operation on a peripheral device disposed under the left/right rear fender would become troublesome.

On the other hand, with the above-described inventive solution, the attachment/detachment of the left and right rear fenders can be carried out without involving attachment/detachment of the protection frame. Thus, maintenance on e.g. the peripheral device of the left and right rear fenders is facilitated.

In the above-described configuration, preferably:
the vehicle body frame includes, at a rear end thereof, a three-point link mechanism for implement connection; and
the connecting member includes a link connecting portion to which a top link of the three-point link mechanism is vertically pivotally pin-connected.

With the above solution, the connecting member acts also as a top link connecting member. Thus, in comparison with an arrangement wherein a connecting member dedicated to the top link is provided instead of the connecting member, it becomes possible to achieve e.g. simplification of the configuration due to reduction in the number of components.

In the above-described configuration, preferably:
the left and right strut members each is formed of a steel pipe and includes a reinforcing member inside the connecting portion; and
the left and right reinforcing members each is formed of a steel plate that has a lateral width for inwardly contacting the left/right connecting portion and that is bent into a shape having a U-shaped portion having a space that allows insertion/withdrawal of the connection tool and a pair of extending portions that extend laterally outwards from an upper end of the U-shaped portion to have extension ends thereof in inward contact with the connecting portion, a bottom portion of the U-shaped portion being welded to the connecting portion.

With the above solution, the left and right reinforcing members are fixed under an appropriate posture at appropriate positions inside the left and right connecting portions in an easy and reliable manner. With this, the left and right connecting portions can be reinforced favorably without impairing the connection between the left and right connecting portions and the left and right supporting portions by the connection tool.

DETAILED DESCRIPTION OF THE PREFERRED EMBODIMENTS

Next, as an example of embodying the present invention, there will be explained an embodiment of applying the present invention to a tractor as an example of a work vehicle, with reference to the accompanying drawings.

Figure 1:
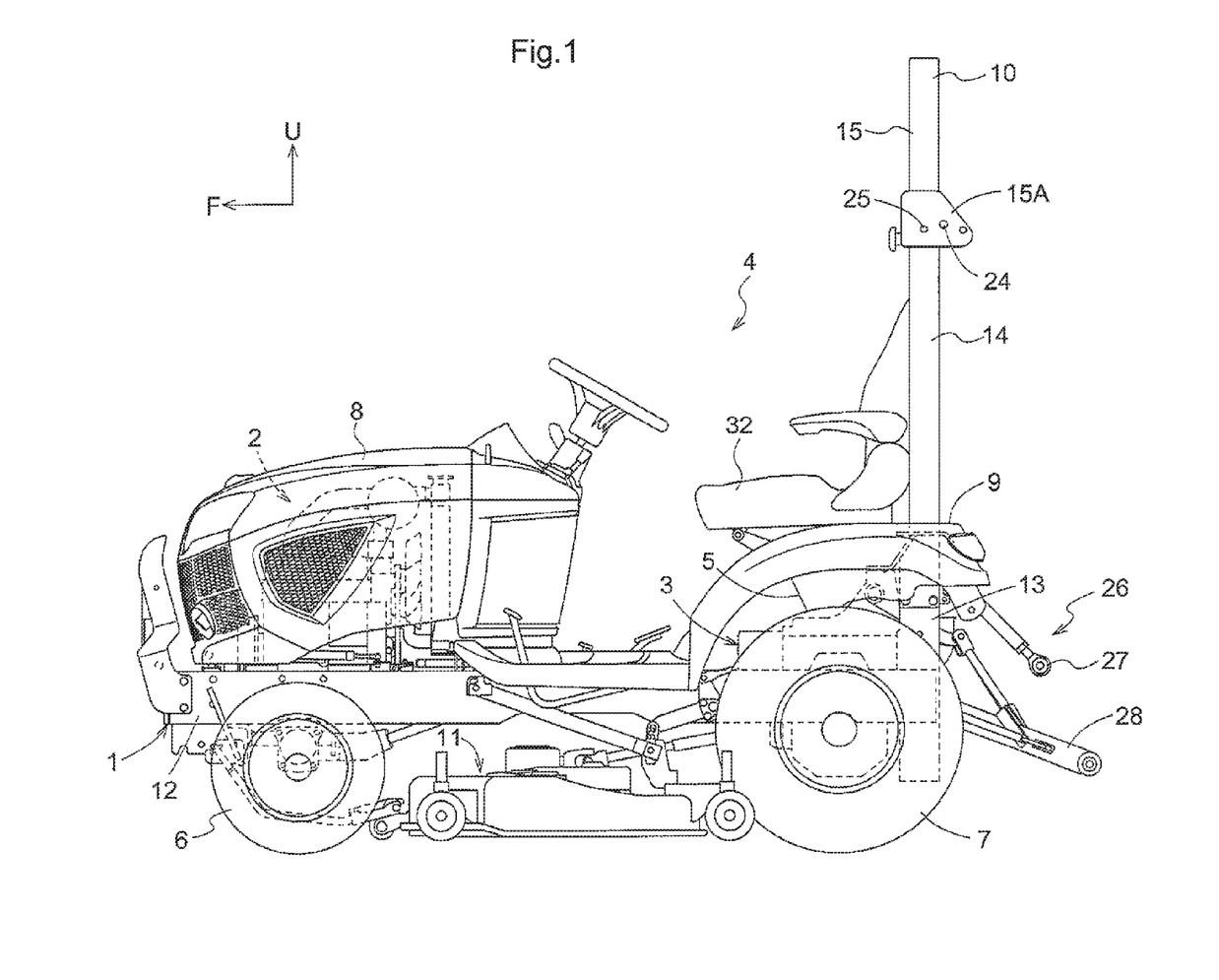
FIG. 1 is a left side view of a tractor.

Incidentally, a direction denoted with an arrow of mark F in FIG. 1 represents the front side of the tractor and a direction denoted with an arrow of mark U therein represents an upper side of the tractor.

Figure 2:
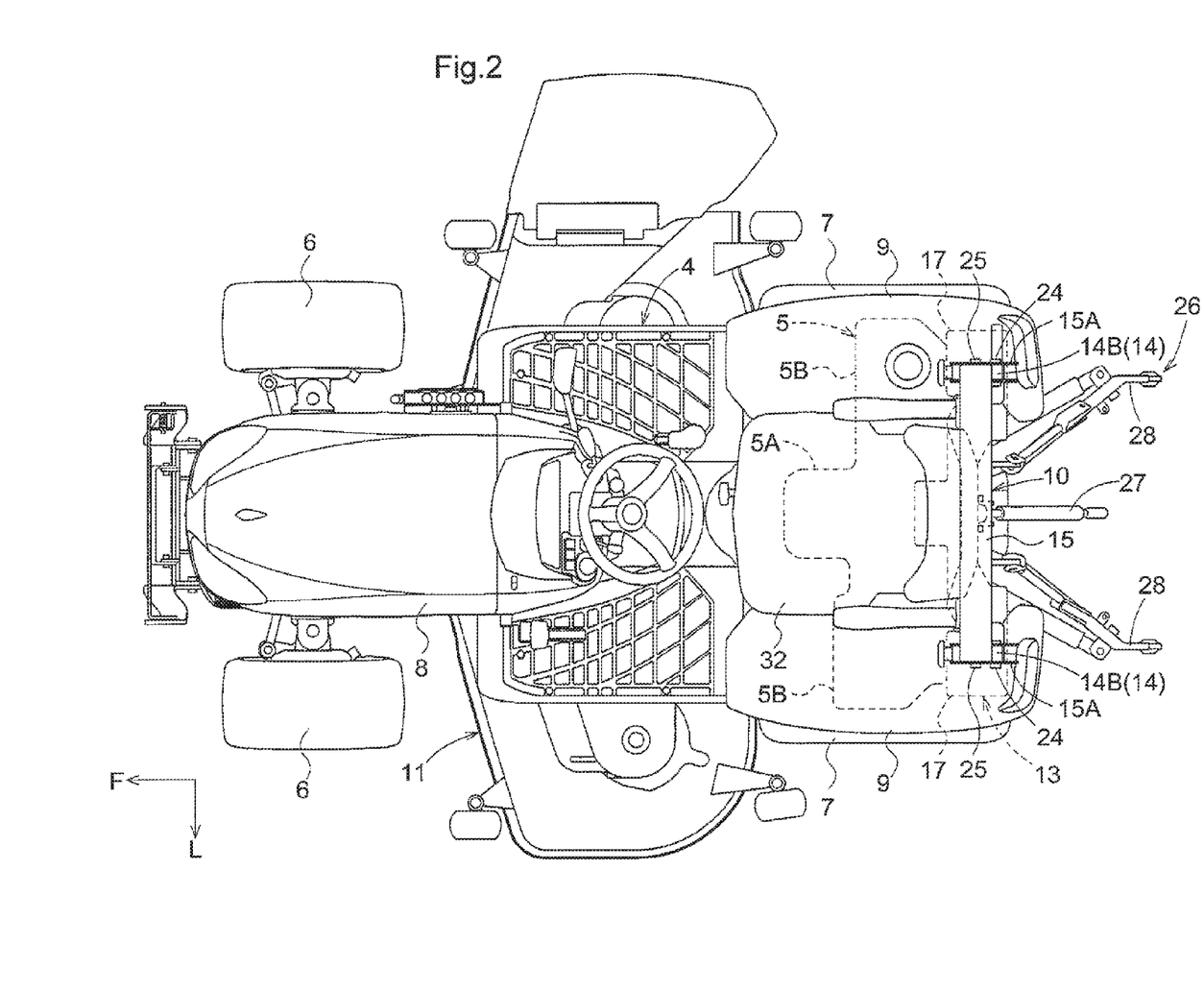
FIG. 2 is a plane view of the tractor.

Further, a direction denoted with an arrow of mark F in FIG. 2 represents the front side of the tractor and a direction denoted with an arrow of mark L therein represents a left side of the tractor.

As shown in FIG. 1 and FIG. 2, a tractor illustrated in the instant embodiment includes a vehicle body frame 1 forming a framework of a vehicle body, an engine unit 2 disposed on a front side of the vehicle body, a speed changer unit 3, a riding type driving section 4 and a fuel tank 5 which are mounted on the rear side of the vehicle body, left and right front wheels 6 that are steerable and driven by power from the engine unit 2, left and right rear wheels 7 that are driven by the power from the engine unit 2, a pivotal opening/closing type hood 8 which covers the engine unit 2, left and right rear fenders 9 which cover the left and right rear wheels 7, a protection frame 10 which extends upwards from the vehicle body frame 1, a mower 11 mounted at a lower body portion between the left and right front wheels 6 and the left and right rear wheels 7, and so on.

As shown in FIGS. 1 through 6, the vehicle body frame 1 includes left and right main frames 12 formed of steel plates and elongate in the front-rear direction, a support frame 13 for detachably supporting the protection frame 10, and so on. The protection frame 10 includes left and right strut members 14 and an arch member 15 extending between the left and right strut members 14, with these members 14, 15 being separable from each other. The support frame 13 includes, at upper ends thereof, left and right supporting portions 13A in the form of pipes for removably supporting the left and right strut members 14. The left and right strut members 14 each includes a connecting portion 14A to be connected to the supporting portion 13A with e.g. a vertical bolt (an example of "connection tool") 16 as being inserted into the supporting portion 13A. The left and right supporting portions 13A are provided in the support frame 13 under a laterally outward tilted posture, with upper sides thereof being positioned on more laterally outer side of the vehicle body.

With the above-described arrangement, when a worker is to assemble the protection frame 10 to the support frame 13, firstly the worker will insert the connecting portions 14A of the left and right strut members 14 which are removed from the arch member 15 into the left and right supporting portions 13A of the support frame 13. Then, under this state, the worker will connect the left and right connecting portions 14A to the left and right supporting portions 13A by the vertical bolts 16 or the like. Thereafter, the worker will connect the arch member 15 to the left and right strut members 14, thus completing the assembly of the protection frame 10.

Under the above-described assembled state, the left and right connecting portions 14A on the protection frame side are inserted into the left and right supporting portions 13A which are set under the laterally outward tilted orientation in the support frame 13. Therefore, even if the connection by the bolt 16 or the like were absent, the protection frame 10 would still be supported to the support frame 13 under a stable state with inhibiting displacement in the horizontal direction and the vertical direction of the protection frame 10 relative to the support frame 13. Moreover, outer faces 14a of the left and right connecting portions 14A on the vehicle body lateral outer side are received and supported firmly by inner faces 13a of the left and right supporting portions 13A on the vehicle body laterally outer side with a large contact area and with a high-pressure contact force due to a wedge effect.

Thus, even if the number of the bolts 16 to be provided for connection between the left and right connecting portions 14A and the left and right supporting portions 13A is decreased, it will still be possible to support the protection frame 10 to the support frame 13 firmly with high supporting strength and with reliable inhibition of inadvertent removal therefrom.

Consequently, there is obtained the protection frame 10 that facilitates assembly, yet allows high-strength fixing to the vehicle body frame 1.

Figure 3:
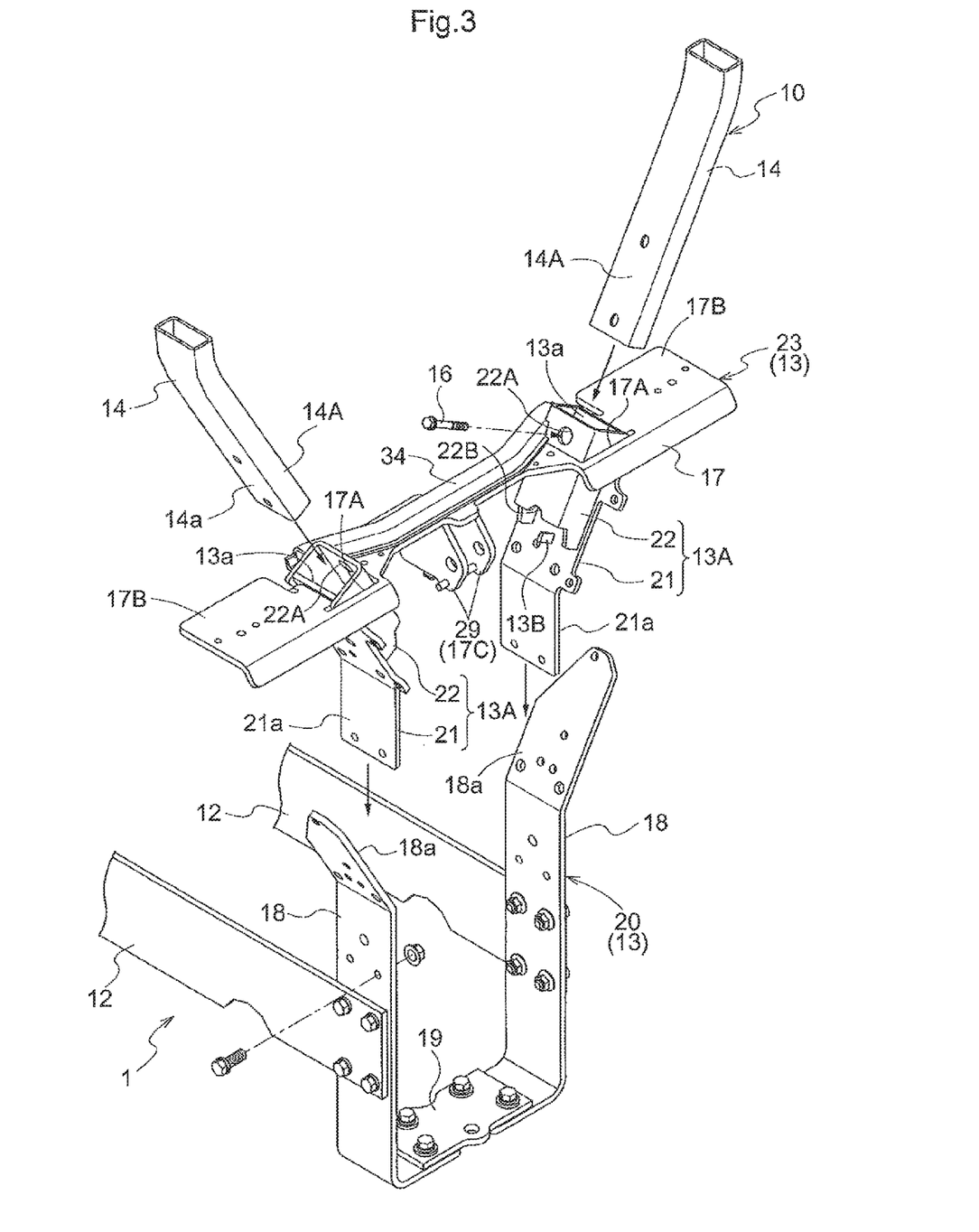
FIG. 3 is an exploded perspective view of principal portions such as arrangements of a support frame and a protection frame.
Figure 4:
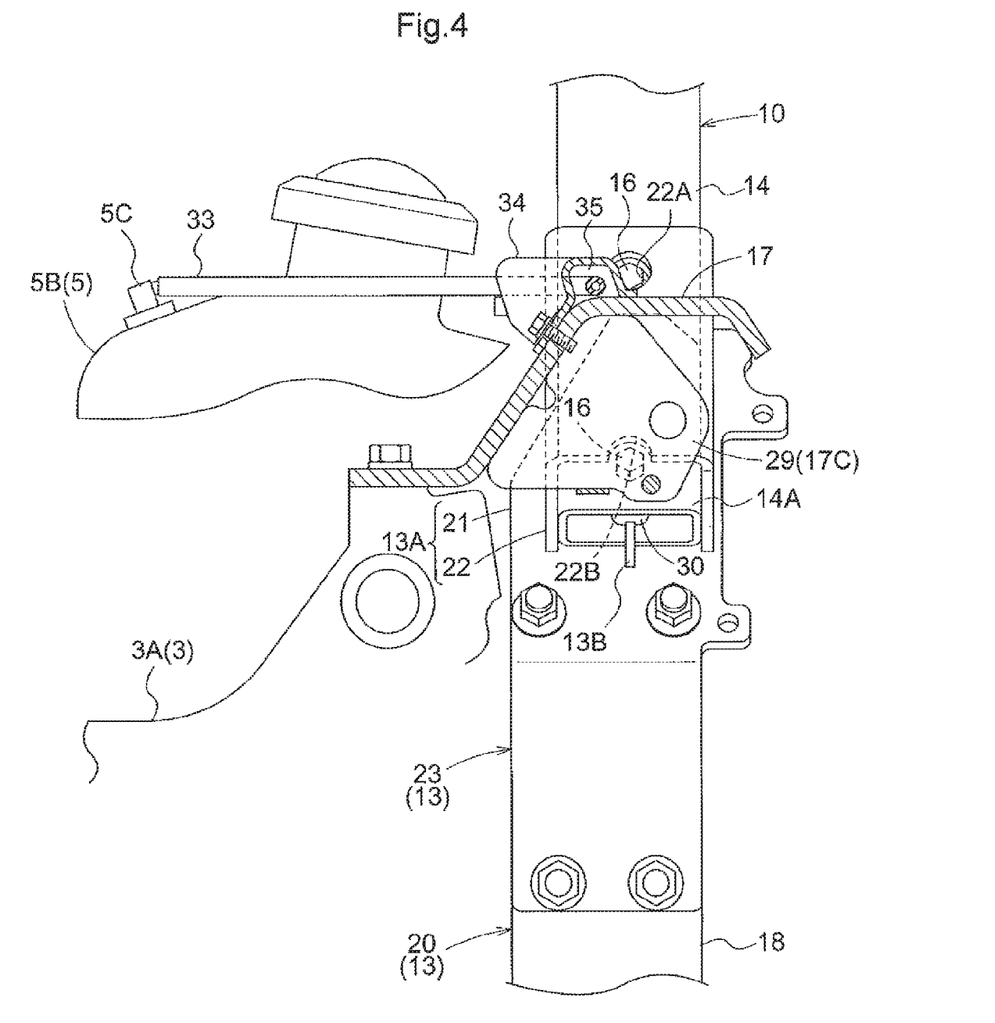
FIG. 4 is a left side view in vertical section of the principal portions such as the arrangements of the support frame and the protection frame.
Figure 6:
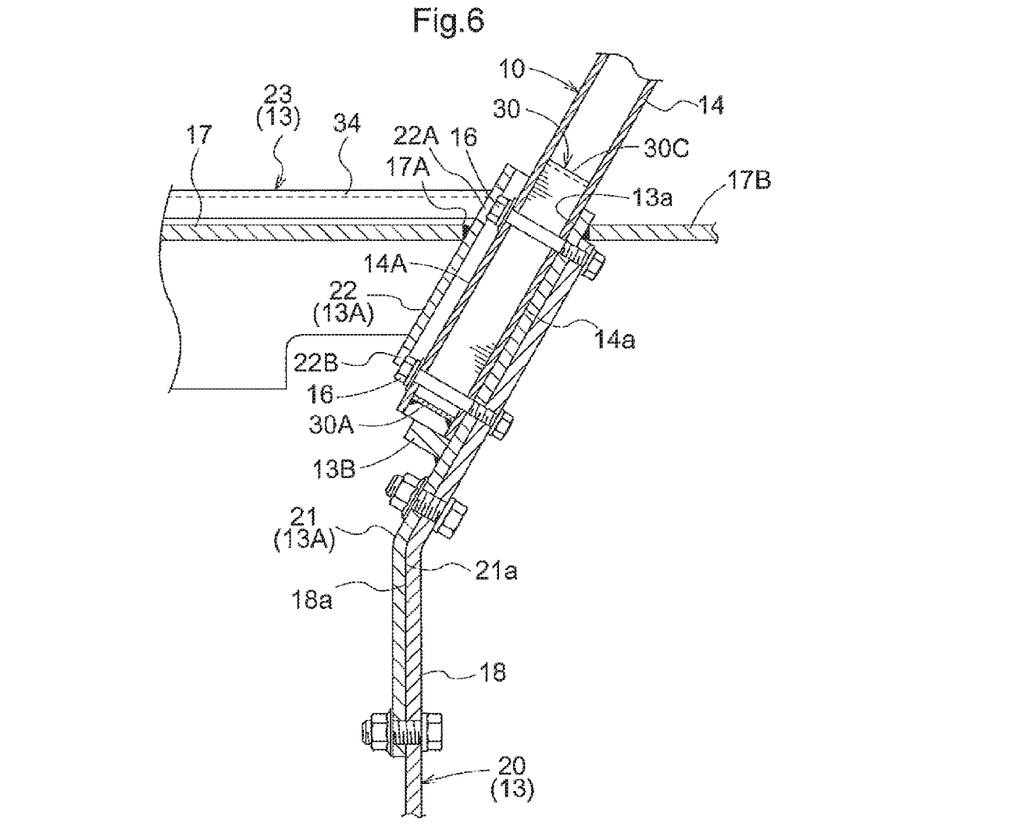
FIG. 6 is a left side view in vertical section of principal portions such as arrangements of a supporting portion and a connecting portion.

As shown in FIG. 3, FIG. 4 and FIG. 6, the support frame 13 includes left and right reception tools 13B for receiving lower ends of the left and right strut members 14 inserted into the left and right supporting portions 13A.

With the above, when the worker effects the bolt-connection by inserting the connecting portions 14A of the left and right strut members 14 into the left and right supporting portions 13A of the support frame 13, the worker need not grip and hold the left and right strut members 14 at predetermined connecting positions.

As a result, the assembly of the protection frame 10 can be further facilitated.

As shown in FIGS. 2 through 6, the support frame 13 includes a laterally elongate connecting member 17 for interconnecting the left and right supporting portions 13A.

With the above arrangement, the connecting member 17 can provide and maintain firm and reliable left-right spacing between the left and right supporting portions 13A, so that possibility of inadvertent increase of the left-right spacing between the left and right supporting portions 13A which could be caused by the wedge effect after the assembly of the protection frame 10 can be avoided reliably.

As a result, the protection frame 10 can be supported in an even more stable manner by the support frame 13 having enhanced shape-retention ability.

Figure 5:
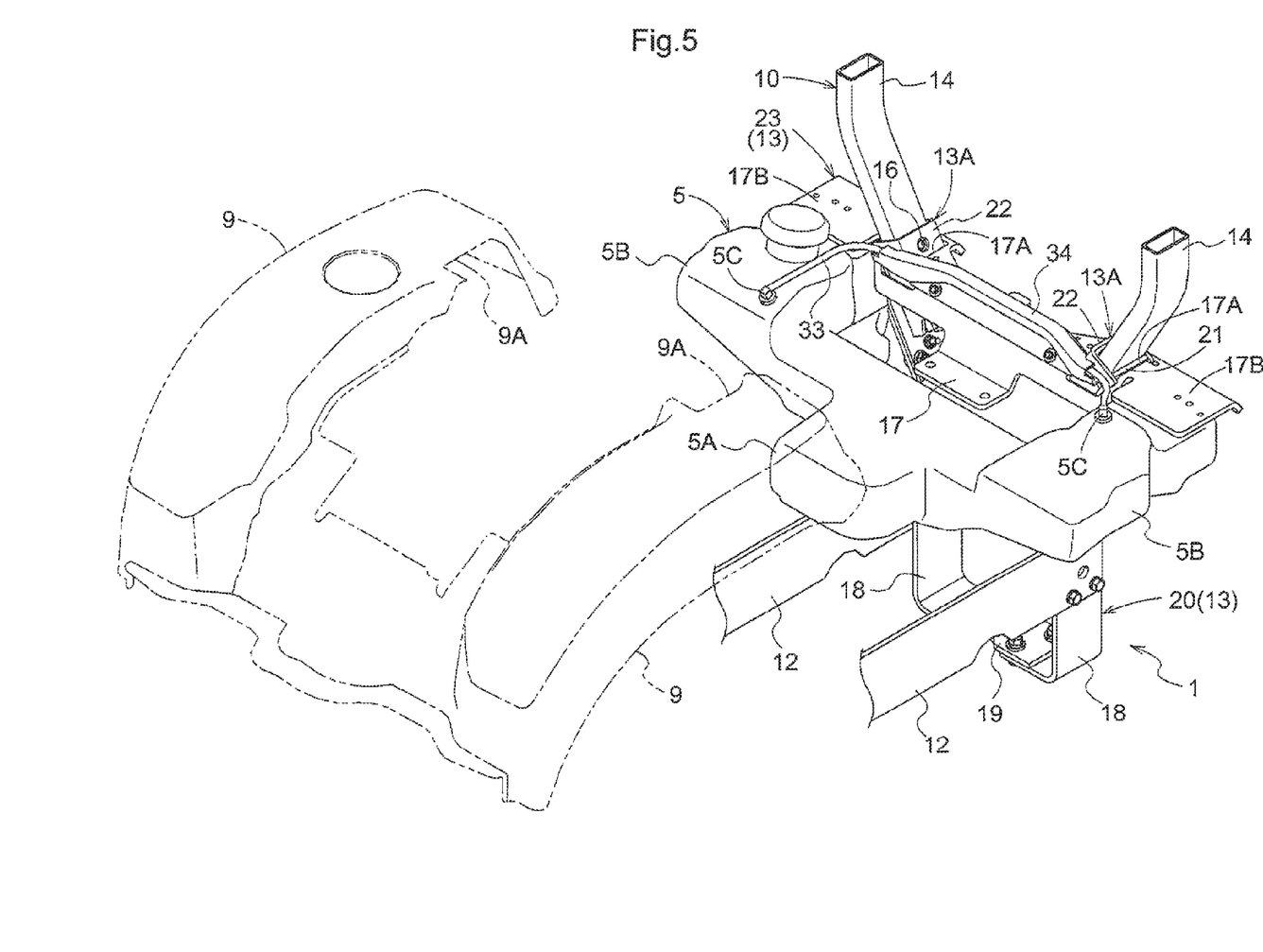
FIG. 5 is a perspective view of principal portions such as the arrangement of the support frame, a shape of a rear fender, etc.

As show in FIG. 3 and FIG. 5, the support frame 13 includes vertically elongate left and right first members 18 in the form of steel plates to be bolt-connected to rear ends of the left and right main frames 12 and a laterally elongate second member 19 in the form of a steel plate attached to lower ends of the left and right first members 18. The left and right first members 18 are bent so that lower ends thereof may extend toward the left-right center of the vehicle body. The left and right first members 18 are bent to assume a laterally outward tilted posture, with upper sides thereof being positioned on more laterally outer side of the vehicle body. The second member 19 has its left and right ends bolt-connected to the lower ends of the left and right first members 18.

As the left and right first members 18 and the second member 19 are connected to each other, there is obtained a lower structure 20. This lower structure 20 has a U-shaped overall shape as seen in the front-rear direction and an upper shape thereof as seen in the front-rear direction comprises an upwardly widening shape with its left-right spacing being larger toward the upper side.

As shown in FIGS. 3 through 6, the left and right supporting portions 13A each is provided in the form of a pipe having a rectangular cross section by a second steel plate 22 having a U-shaped cross section being welded to the top of a first steel plate 21 bent into a shape conforming to the top portion of the first member 18. The left and right second steel plates 22 include a through hole 22A and a cutout 22B that allow insertion and withdrawal of a tool or the like at time of the bolt connection between the supporting portion 13A and the connecting portion 14A. The connecting member 17 is formed of a steel plate having, at left and right opposed ends thereof, openings 17A into which the left and right supporting portions 13A are inserted under the above-described laterally outward tilted posture. The left and right supporting portions 13A are welded to the connecting member 17 with the upper end portions thereof being inserted into the left and right openings 17A of the connecting member 17.

With the welding of the left and right supporting portions 13A and the connecting member 17, there is obtained an upper structure 23. This upper structure 23 has a shape that allows its mounting on the top of the lower structure 20 with outer faces 21a of the left and right first steel plates 21 coming into face contact with inner faces 18a of the upper sides of the left and right first members 18.

The upper structure 23 is mounted on top of the lower structure 20 and fixed thereon, as the left and right first steel plates 21 are bolt-connected to the left and right first members 18 and the connecting member 17 is bolt-connected to a casing 3A of the speed changer unit 3.

As shown in FIG. 3, FIG. 4 and FIG. 6, the left and right reception tools 13B are formed of steel plates and welded under an erect state to portions in the left and right first steel plates 21 downwardly of the second steel plates 22.

As shown in FIGS. 1 through 6, the left and right strut members 14 and the arch member 15 are comprised of angular steel pipes having a rectangular cross section, with connecting portions 14B, 15A provided at their connecting ends being connected via a bolt 24 oriented in the left-right direction which acts also as a pivot for the arch member 15. And, with this connection arrangement, the arch member 15 can be pivotally displaced between a protection position immediately above the left and right strut members 14 and a storage position immediately behind the left and right strut members 14. And, arch member 15 can be fixedly maintained at the protection position by a lock pin 25 or at the storage position. The left and right strut members 14 are formed bent into a shape wherein upper portions of the left and right strut members 14 assume a perpendicular posture when their lower connecting portions 14A are connected to the left and right supporting portions 13A.

As shown in FIG. 2, FIG. 3, FIG. 5 and FIG. 6, the connecting member 17 includes left and right extending portions 17B that extend laterally outward from the left and right supporting portions 13A, the left and right extending portions 17B supporting upper ends of left and right rear fenders 9. The left and right rear fenders 9 include recessed portions 9A provided on left-right one end sides on the vehicle body inner side at upper ends thereof and configured to allow introduction of the left and right supporting portions 13A.

Namely, the connecting member 17 acts also as a supporting member for the left and right rear fenders 9. Thus, in comparison with an arrangement wherein supporting members dedicated to the rear fenders are provided instead of such connecting member 17, it becomes possible to achieve e.g. simplification of the configuration due to reduction in the number of components.

Moreover, contact between the left and right rear fenders 9 and the left and right supporting portions 13A is avoided, thus increasing the spacing between the left and right supporting portions 13A. With this, it becomes possible to support the protection frame 10 in an even more stable manner.

Incidentally, in order to increase the spacing between the left and right supporting portions 13A, it is conceivable to form supporting portion inserting openings in the left and right rear fenders 9. In such case, however, an attachment/detachment operation of the left and right rear fenders 9 will involve attachment/detachment of the protection frame 10 also. Therefore, the attachment/detachment of the left and right rear fenders 9 will become more troublesome. Consequently, the operations for attachment/detachment of the left and right rear fenders 9 such as a maintenance operation on a peripheral device, e.g. the fuel tank 5, disposed under the left/right rear fender 9 would become troublesome.

On the other hand, with the above-described tractor, the attachment/detachment of the left and right rear fenders 9 can be carried out without involving attachment/detachment of the protection frame 10. Thus, maintenance on e.g. the peripheral device of the left and right rear fenders 9 is facilitated.

Incidentally, the left and right fenders 9 comprise a left-right integrated construction having their front portions being formed continuously from each other.

As shown in FIGS. 1 through 4, the vehicle body frame 1 includes, at a rear end thereof, a three-point link mechanism 26 for implement connection. The connecting member 17 includes a link connecting portion 17C to which a top link 27 of the three-point link mechanism 26 is vertically pivotally pin-connected.

Namely, the connecting member 17 acts also as a top link 27 connecting member. Thus, in comparison with an arrangement wherein a connecting member dedicated to the top link is provided instead of the connecting member 17, it becomes possible to achieve e.g. simplification of the configuration due to reduction in the number of components.

Left and right lower links 28 of the three-point link mechanism 26 are supported to the left and right first members 18 to be vertically pivotable. The link connecting portion 17C is comprised of left and right steel plates 29 welded to a left-right center portion of the back face of the connecting member 17.

Figure 7:
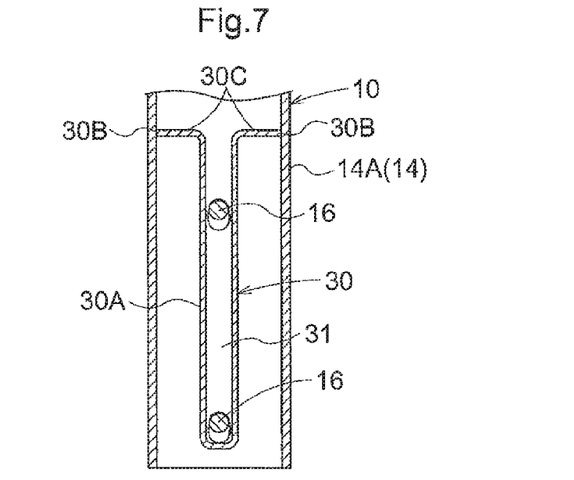
FIG. 7 is a front view in vertical section of principal portions such as a reinforcement arrangement of the connecting portion.

As shown in FIG. 6 and FIG. 7, the left and right strut members 14 respectively include a reinforcing member 30 inside the connecting portion 14A. The left and right reinforcing members 30 each is formed of a steel plate that has a lateral width for inwardly contacting the left/right connecting portion 14A and that is bent into a shape having a U-shaped portion 30A having a space 31 that allows insertion/withdrawal of the bolt 16 and a pair of extending portions 30C that extend laterally outwards from an upper end of the U-shaped portion 30A to have extension ends 30B thereof in inward contact with the connecting portion 14A, a bottom portion of the U-shaped portion 30A being welded to the connecting portion 14A.

With the above, the left and right reinforcing members 30 are fixed under an appropriate posture at appropriate positions inside the left and right connecting portions 14A in an easy and reliable manner. With this, the left and right connecting portions 14A can be reinforced favorably without impairing the connection between the left and right connecting portions 14A and the left and right supporting portions 13A by the bolts 16 or the like.

As shown in FIG. 4 and FIG. 5, the fuel tank 5 has a U-shape as seen in the front-rear direction, with its reservoir portion 5B disposed at the left-right center between the speed changer unit 3 and the driver's seat 32 of the driving section 4 being disposed lower than its left and right reservoir portions 5A which are disposed between the left and right rear wheels 7 and the left and right rear fenders 9. The fuel tank 5 includes a bypass hose 33 for air communication in order to establish air communication at upper end regions in the inner spaces of the left and right reservoir portions 5A. This bypass hose 33 extends through a hose guiding passage 35 formed between the upper face of the connecting member 17 and a cover member 34 attached to the top of the connecting member 17 to be eventually connected to connecting portions 5C provided at upper portions of the left and right reservoir portions 5B.

With the above arrangement, it is possible to prevent risk of the bypass hose 33 being entrapped between other components.

Further, with the above, the bypass hose 33 can be connected to the connecting portions 5C of the left and right reservoir portions 5B with less possibility of development of slackness therein. Thus, even when fuel enters the bypass hose 33 due to significant tilt of the vehicle body in the left-right direction, it is possible to avoid the risk of the fuel being retained and stagnated at the slacked portion of the bypass hose 33, thus impairing its function as a communication passage.

Though not shown, the cover member 34 defines a plurality of attaching holes for enabling attachment of an electric wire clamp. With this arrangement, the cover member 34 can be used also as a supporting member for electric wire.

Other Embodiments

The present invention is not limited to the configurations or arrangements described in the foregoing embodiment. Next, some other representative alternative embodiments of the present invention will be described.

[1] The vehicle body frame 1 can be configured such that the casing 3A of the speed changer unit 3 is used also as the rear portion side of the vehicle body frame 1.

[2] It may be disposed on the front side or front-rear center side of the vehicle body frame 1 also.

[3] The protection frame 10 can be configured such that the left and right strut members 14 and the arch member 15 are formed of a steel pipe having a round cross section or the left and right strut members 14 and the arch member 15 are formed of a steel pipe having a U-shaped or C-shaped cross section, etc.

[4] The protection frame 10 can be configured such that the arch member 15 can be inserted to or withdrawn from the left and right strut members 14 and the arch member 15 is fixedly held to the left and right strut members 14 as being inserted therein.

[5] The support frame 13 can be formed of a steel pipe having a round or rectangular cross section, etc. or a steel member having a U-shaped, C-shaped cross section or the like. Further alternatively, the support frame 13 can be comprised of combination of a steel member having a U-shaped, C-shaped cross section or the like and a steel plate.

[6] The connecting member 17 can be formed of a steel pipe having a round or rectangular cross section or a steel member having U-shaped, C-shaped cross section, etc.

[7] The left and right reinforcing members 30 can be provided as a member having a shape bent to include a downwardly oriented U-shaped portion 30A having a space 31 allowing insertion/withdrawal of the connection tool 16 and a pair of extending portions 30C that extend laterally outward from the lower end of the U-shaped portion 30A to place the extension end 30B into inward contact with the connecting portion 14A, with the pair of extending portions 30C being welded to the connecting portion 14A.

The invention claimed is:

1. A work vehicle comprising:
a vehicle body frame;
a protection frame extending upwards from the vehicle body frame, the protection frame including left and right strut members and an arch member extending between and detachable from the left and right strut members;
a support frame provided in the vehicle body frame and configured to support the protection frame to the vehicle body frame, the support frame including a pair of left and right pipe-like supporting portions, each supporting portion being provided under a laterally outward tilted orientation with an upper portion of the supporting member being positioned on a more laterally outer side of a vehicle body and being configured to removably support the strut member; and
a connection tool configured to non-removably connect the left and right strut members to the left and right supporting portions.

2. The work vehicle according to claim 1, wherein the support frame includes left and right reception tools for receiving lower ends of the left and right strut members inserted into the left and right supporting portions.

3. The work vehicle according to claim 1, wherein the support frame includes a laterally elongate connecting member for interconnecting the left and right supporting portions.

4. The work vehicle according to claim 3, wherein:
the support frame is disposed at a rear portion of the vehicle body frame;
the connecting member includes left and right extending portions that extend laterally outward from the left and right supporting portions, the left and right extending portions supporting upper ends of left and right rear fenders; and
the left and right rear fenders include recessed portions provided on left-right one end sides on the vehicle body inner side at upper ends thereof and configured to allow introduction of the left and right supporting portions.

5. The work vehicle according to claim 3, wherein:
the vehicle body frame includes, at a rear end thereof, a three-point link mechanism for implement connection; and
the connecting member includes a link connecting portion to which a top link of the three-point link mechanism is vertically pivotally pin-connected.

6. The work vehicle according to claim 1, wherein:
the left and right strut members each is formed of a steel pipe and includes a reinforcing member inside the connecting portion; and
the left and right reinforcing members each is formed of a steel plate that has a lateral width for inwardly contacting the left/right connecting portion and that is bent into a shape having a U-shaped portion having a space that allows insertion/withdrawal of the connection tool and a pair of extending portions that extend laterally outwards from an upper end of the U-shaped portion to have extension ends thereof in inward contact with the connecting portion, a bottom portion of the U-shaped portion being welded to the connecting portion.

* * * * *